(12) United States Patent
Daly (10) Patent No.: US 6,697,109 B1
(45) Date of Patent: Feb. 24, 2004

(54) METHOD AND SYSTEM FOR FIELD SEQUENTIAL COLOR IMAGE CAPTURE

(75) Inventor: Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/306,685

(22) Filed: May 6, 1999

(51) Int. Cl.$^7$ .................. H04N 9/004; H04N 9/007; H04N 3/014; H04N 5/335; H04N 9/083
(52) U.S. Cl. .................. 348/268; 348/266; 348/273
(58) Field of Search ................ 348/272, 273, 348/277, 270, 280, 317, 266, 267, 268, 269, 612, 620, 218.1, 490, 70, 607, 608, 613, 234, 453, 456, 488, 503, 513; 358/500, 503, 505, 512, 513, 515; 382/260; 349/106

(56) References Cited

U.S. PATENT DOCUMENTS

| | | | |
|---|---|---|---|
| 2,738,377 A | | 3/1956 | Weighton |
| 3,604,839 A | | 9/1971 | Kitsopoulos |
| 3,969,763 A | | 7/1976 | Tan |
| 4,067,043 A | | 1/1978 | Perry |
| 4,404,585 A | * | 9/1983 | Hjortzberg .................. 348/271 |
| 4,415,923 A | * | 11/1983 | Noda .................. 348/675 |
| 4,851,899 A | | 7/1989 | Yoshida et al. |
| 4,967,264 A | | 10/1990 | Parulski et al. |
| 5,084,761 A | | 1/1992 | Nitta |
| 5,442,394 A | * | 8/1995 | Lee .................. 348/264 |
| 5,512,956 A | * | 4/1996 | Yan .................. 348/606 |
| 5,548,333 A | | 8/1996 | Shibazaki et al. |
| 5,748,236 A | | 5/1998 | Shibazaki |
| 5,751,384 A | | 5/1998 | Sharp |
| 5,767,899 A | | 6/1998 | Hieda et al. |
| 5,798,948 A | * | 8/1998 | Rashkovskiy et al. ...... 348/620 |
| 6,005,616 A | * | 12/1999 | Itoh et al. .................. 348/269 |
| 6,208,393 B1 | * | 3/2001 | Bawolek et al. .......... 349/106 |
| 6,504,573 B2 | * | 1/2003 | Kubota et al. .............. 348/270 |

OTHER PUBLICATIONS

A.B. Watson, *Perceptual–components architecture for digital video*, JOSA A V.7, #10, pp 1943–1954, 1990.
K.T. Mullen, *The contrast sensitivity of human colour vision to red–green and blue–yellow chromatic gratings*, J. Physiol V.359, pp 381–400 1985.
L. Arend et al., *color breakup in sequentially scanned LCDs*, SID 94 Digest, pp 201–204 1994.
D. Post et al., *Predicting color breakup on field sequentially displays*, SPIE Proc. V. 3058, pp 57–65 1997.
Hunt, *The reproduction of colour in photography, printing and television*, 4th Ed., pp 409–410 Fountain Press, England 1987.

* cited by examiner

Primary Examiner—Wendy R. Garber
Assistant Examiner—Justin Misleh
(74) Attorney, Agent, or Firm—Robert D. Varitz, P.C.

(57) ABSTRACT

A method of field sequential color image capture includes optically capturing a scene; filtering the scene through an active color filter to product first color components, thereby modifying the spectral transmission of the scene as a function of time; detecting the scene with a single, monochrome sensor and dividing the scene into multiple second color components, whereby each first color component of the scene is detected at a different point in time; aligning the second color components in time for each frame interval; storing each color component in a memory unit; combining the stored second color components into a frame image; and processing the frame image for color reproduction and format. A system for capturing a field sequential color image, includes an optical capture mechanism for capturing a scene frame-by-frame in frame intervals; an active color filter for producing multiple first color components; a single monochrome area sensor; an array field selector for dividing the scene into multiple second color components; multiple memory locations for storing each color component; a field-to-frame combiner for combining the stored second color components into a frame image; and a color reproduction processor for processing the frame image for color reproduction and format.

21 Claims, 8 Drawing Sheets

Fig. 4 2D NYQUIST BOUNDARIES, OPTICS, VISUAL CSF

METHOD AND SYSTEM FOR FIELD SEQUENTIAL COLOR IMAGE CAPTURE

FIELD OF THE INVENTION

This invention relates to the capture of color motion imagery by using sequential frame samples of different color filtration, referred to as field sequential color capture.

BACKGROUND OF THE INVENTION

Color lag is the result of capturing color components of an image at different times during exposure of a single frame. One way to solve this problem is to use multiple sensors, each capturing a color component. As will be explained, this approach has its own set of problems. There are, in the field of visual system modelling, three basic visual properties relating the luminance channel, as represented by video Y, and the opponent color channels, as approximated by the color difference signals, U and V. where B−Y=U and R−Y=V. These are:
1. The maximum temporal frequency response of the opponent color system is less than ½ that of the luminance.
2. The maximum spatial frequency response of the opponent color system is near ½ that of the luminance.
3. The maximum sensitivity of opponent color system is slightly greater than ½ that of the luminance.

The first and second properties are best described in A. B. Watson, Perceptual-components architecture for digital video, JOSA A V. 7 # 10, pp. 1943–1954, 1990; while the third property is described in K. T. Mullen. The contrast sensitivity of human colour vision to red-green and blue-yellow chromatic gratingsJ. Physiol. V. 359, pp. 381–400, 1985. These three properties will be used in the selection of the relative durations of exposures in order to prevent color lag and in the spatio-temporal integration following image capture.

L. Arend et al., *Color breakup in sequentially scanned LCDs*. SID 94 Digest, pp 201–204, 1994; and D. Post et al. Predicting color breakup on field-sequential displays, SPIE Proc. V. 3058, pp 57–65, 1997, specifically investigate color break-up, or color lag. Although the research behind these papers is intended for application to field sequential color displays, some of the findings are relevant to color field sequential capture (FSC). One of these is that color lag detection has a strong luminance component. In fact, as the color offset between R, G and B layers is increased from zero to detectability, the first signal to exceed threshold is the luminance. This manifests itself as blurring in texture before any high contrast edge blur occurs, because of the masking effects caused by high contrast edges. Eventually, as the offset is increased, color artifacts become visible at high contrast edges.

Hunt, *The reproduction of colour in photography, printing, and television*, 4th edition, pp. 409–410, Fountain Press, England, describes work done with YRB camera systems. These were primarily investigated for 3-sensor systems when the sensors where tubes. The YRB system attempted to reduce the visibility of the color offset problem due to manufacturing tolerances by optically aligning the tubes. Due to complications with gamma correction, it was abandoned in favor of a RGBY systems using four tubes. These complications, which were extremely difficult to resolve in analog systems, are now easily resolved in digital signal processing.

In order to appreciate the advantages of field sequential color capture, two other common approaches must be understood. One other approach is the use of three sensors, typically using red, green, and blue filtration, which simultaneously capture the scene's dynamic content. This technique is used with both tube pickup devices and with 2D sensor arrays, such as charge coupled devices (CCD) or composite metal-on-silicon (CMOS) devices, which are referred to in the literature as 3-CCD cameras.

Another approach is the use of a single 2D sensor having color filtration applied separately to each pixel. The colors are arranged in spatially varying manners designed to provide a high spatial bandwidth for luminance or green, and to minimize color aliasing artifacts. The result is that each color layer has incomplete samples per frame, however, special interpolation algorithms are used to reconstruct full dimensioned frames for each color layer. This approach is known as color filter array (CFA) camera capture.

The 3-CCD, or 3-tube, approach's chief disadvantage is the cost of three sensors. A second disadvantage is the problem of color mis-registration between the three sensors due to their alignment in the optical path relative to the scene, which may impose tight manufacturing tolerances that increase manufacturing costs. Color mis-registration may cause luminance blur in textures with very small amounts of mis-registration, and may cause color bleeding, also referred to as color fringing, at both achromatic and chromatic edges. If the registration is well aligned, the 3-CCD approach achieves the resolution of the sensors for all three color layers of a frame. Due to cost issues and manufacturing constraints, however, these approaches are only used for high-end studio video cameras, and digital still cameras aimed for the professional and advanced hobbyist.

The CFA approach is less costly because it uses only a single sensor, however, its disadvantages include reduced spatial resolution, the necessity for an interpolation algorithm to reconstruct the three color frames for display, and necessity for an anti-aliasing filter to prevent diagonal luminance high spatial frequencies from aliasing into lower frequency color patterns and to prevent color high spatial frequencies from aliasing into luminance or color patterns. Consequently, there is a trade-off between sharpness and color artifacts. These artifacts are quite noticeable in such common image content as highlight reflections in eyes, and the expected luminance high spatial frequencies in texture, e.g., hair, or geometric patterns. In current implementations, fairly complex interpolation algorithms, which include pattern recognition, are used to try to maximize sharpness and minimize color spatial artifacts. The sharpness/aliasing tradeoff may be described via FIG. 3, using either filter 42 or filter 44. Either filter may be increased in bandwidth by scaling their shape on the frequency axis. Though the image will appear to be sharper, signals having a frequency higher than that of the digital Nyquist will be aliased, i.e., the signal will fold over to frequencies lower than that of the digital Nyquist. These false lower frequencies are, in effect, added to the true signal. If all of the aliasing is removed, however, the image will appear blurred. It therefore requires a certain amount of craftsmanship in designing the filters to provide an appropriate amount of aliasing in order to maintain the bandwidths as high as possible. Most camera manufacturers opt to avoid any chromatic aliasing, because it is a new categorical distortion, and favor the sharpness reduction, which is already present to some extent. In summary, the two common approaches do not achieve the resolution of their sensors dimensions, either in luminance or in color.

Figure 1:
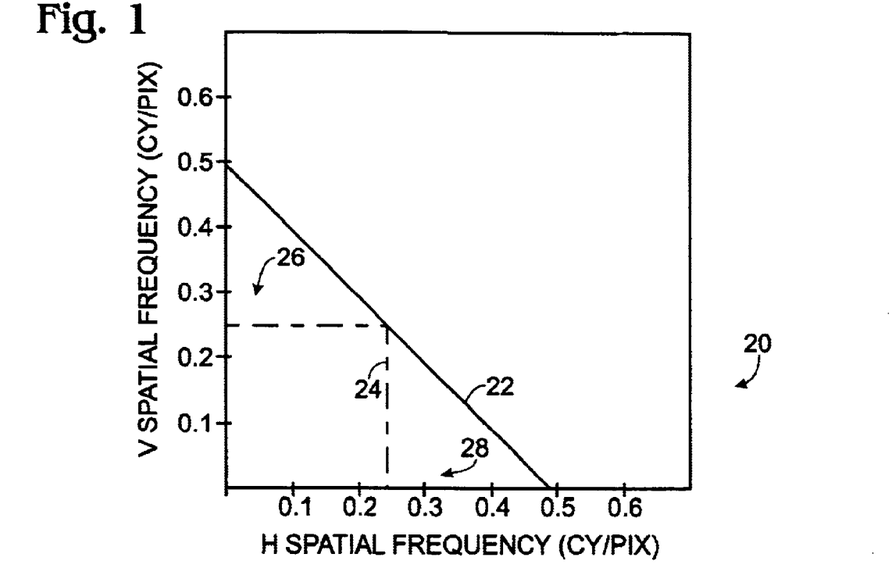
FIG. 1 depicts the frequency capability of a color filter array (CFA) sensor.

The foregoing characteristics are depicted in FIG. 1–6. In FIG. 1, the Nyquist folding frequencies for the typical 2D CFA, also known as a Bayer pattern, are depicted, which are collectively referred to as the Nyquist boundary. Line 22, with a slope of −1, is the boundary for green. The green boundary may achieve the value of 0.5 cycles/pixel (cy/pix) only at the horizontal and vertical frequencies. The red and blue components are shown by line 24 and are restricted to the square region limited by 0.25 cy/pix. Generally these color signals are manipulated so that G captures luminance, and R and B capture chrominance difference signals, by taking their difference or ratio with G. This means that luminance information with higher frequencies than those indicated in triangles 26, 28, which will alias into lower frequencies, showing up as both luminance and chrominance alias patterns. Similar effects occur for chrominance information outside of the smaller Nyquist square 24 boundary. Because it is most critical to get minimally aliased luminance information in an image, only the luminance Nyquist boundaries in the figures are discussed herein.

Figure 2:
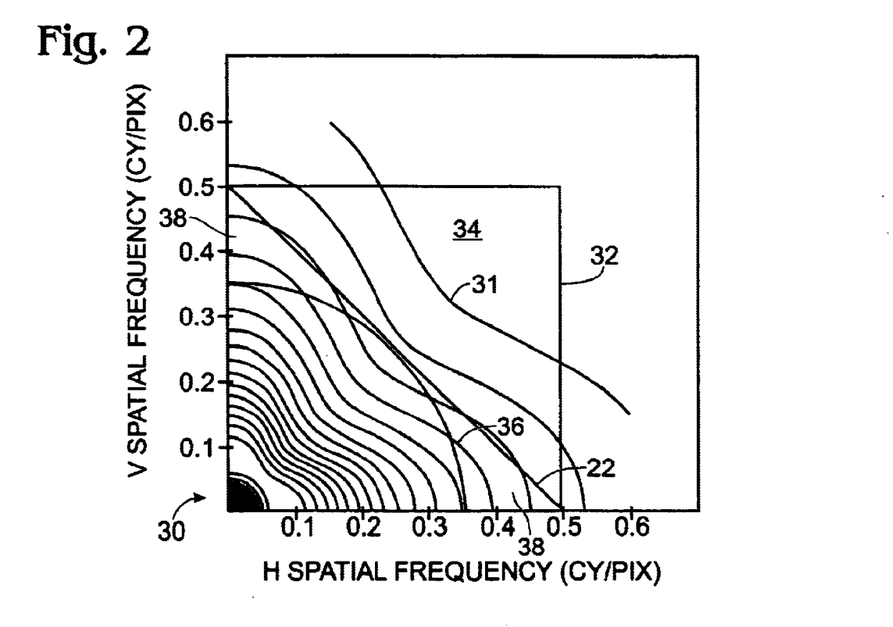
FIG. 2 compares CFA and full frame sensors, isotropic optics, and the human visual system.
Figure 2A:
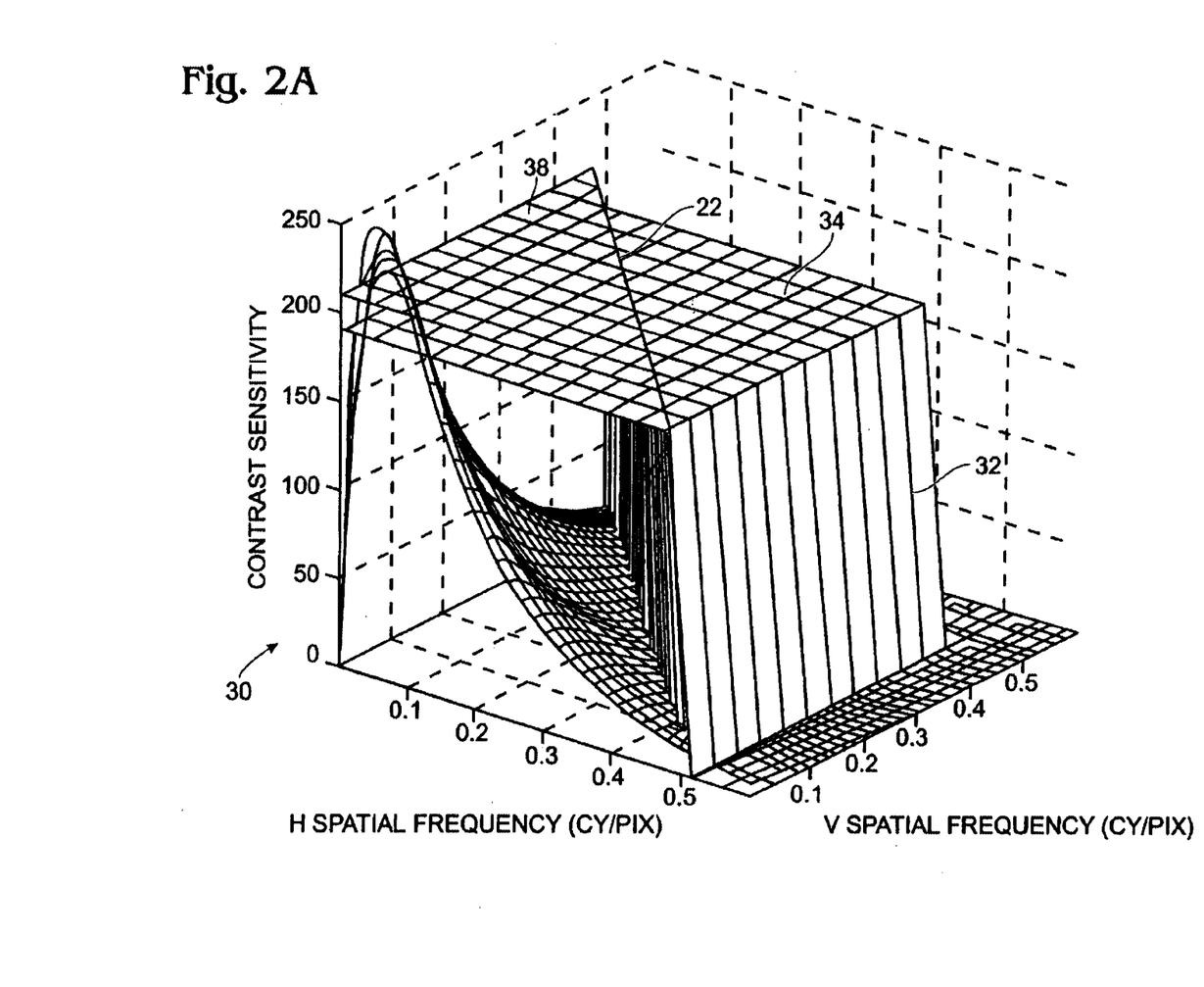
FIG. 2*a* is a 3D representation of FIG. 2.

FIG. 2 includes several additional elements. FIG. 2a is a similar representation depicted in 3D. Contours 30 (FIG. 2 only) depict the human visual system contrast sensitivity function (CSF), which is analogous to its frequency response. This CSF is mapped to the digital frequency plane, based on calibration via the size of the image in pixel heights, and the viewing distance as expressed in units of picture heights. This mapping is a way of normalizing the actual physical display size and viewing distance. In FIG. 2, the displayed image size is 480 pixels high and the viewing distance is 6 picture heights (6H), which is the traditional NTSC image size. The CSF is a 2D surface, whose values are shown as a contour plot, with a peak frequency response near 0.08 cy/pix, for this viewing distance, which is six picture heights (H). The actual distance is dependent on the size of the display, however, "normalization" eliminates the need to include the actual viewing distance. The highest frequency contour 31 corresponds to the highest frequency the human eye can see.

The Nyquist boundary 32 for a full frame image capture system is depicted, which is the case for either 3-CCD systems or FSC color systems. This region is bounded by 0.5 cy/pix in both the horizontal and vertical directions, also referred to as "shutter RGB". Area 34, located between the triangle formed by the luminance CFA boundary 22 and rectangle 32, is the resolution advantage of the full-frame over the CFA approaches. While this looks impressive, resulting in a doubling of the area of the CFA boundary, it is tempered by the visual system frequency response, whose anisotropy causes its isocontours to more closely follow the CFA pattern.

The final addition to FIG. 2 is the optical antialiasing filter which is used to prevent frequencies higher than the CFA Nyquist limit from reaching the sensor. If we assume the system's focusing lens is used for invoking this function, it is generally isotropic, and to prevent aliasing at 45 degrees, we must select its bandwidth as shown by circular line 36. Note that some high vertical and horizontal frequencies that are actually lower than Nyquist limits imposed by the CFA are lost, as represented by area 38, located between CFA boundary 22 and optical cutoff filter boundary 26.

Figure 3:
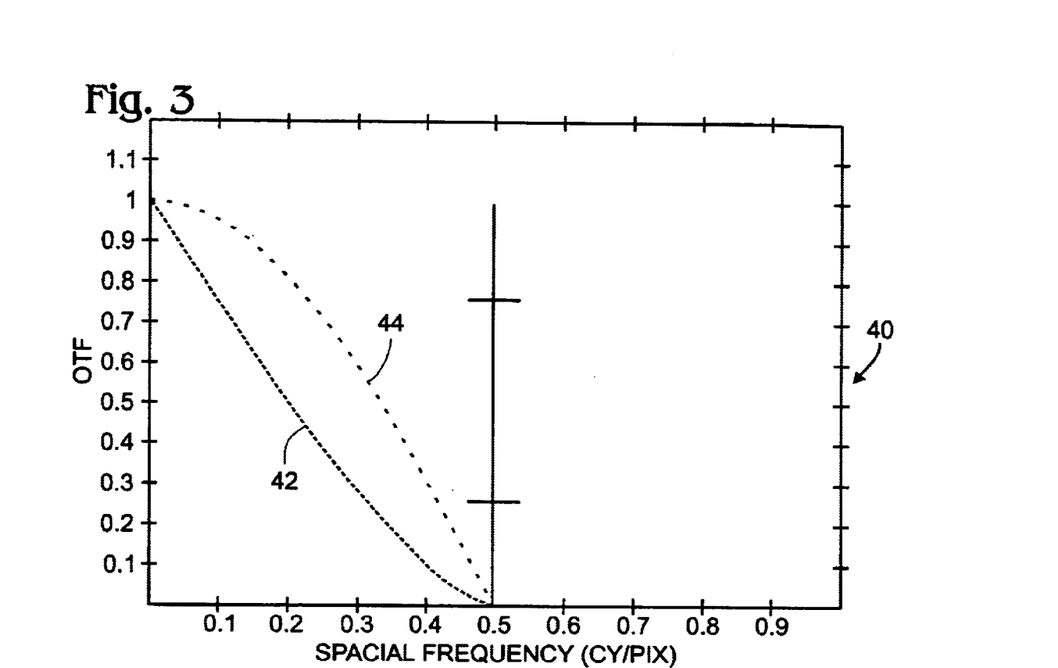
FIG. 3 depicts frequency response of diffraction-limited optics and birefringent crystal.

Lens optics are not generally used for antialiasing. A birefringent crystal filter is used because it has a better frequency response for a given cut-off frequency, as shown in FIG. 3, generally at 40. The optical transfer function (OTF) is the frequency response of the lens in use. In FIG. 3, the frequency response of an optical lens may at best be diffraction limited, and that response is shown as curve 42, which is designed to cut-off at the Nyquist of 0.5 cy/pix. The birefringent filter merely causes a displacement in the beam, resulting in two impulse responses in the spatial domain, which may be modeled as a cosine in the frequency domain. This response is shown as line 44, which is designed for the same cutoff frequency of 0.5 cy/pix.

Figure 4:
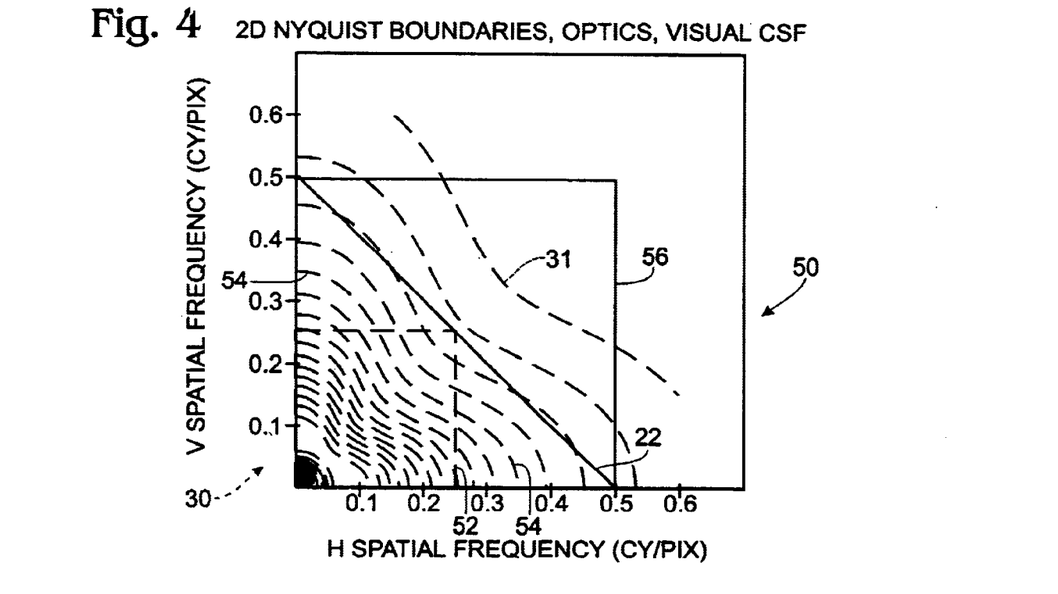
FIG. 4 depicts CFA and full frame sensors, 2D birefringent optics and human visual system.

Although the birefringent crystal filter has better frequency response characteristics for a given cut-off frequency, the usual technique is to have one crystal displace a pixel horizontally, and to then cascade another crystal which causes a vertical displacement, as may be seen in FIG. 3. The net effect is a Cartesian-separable low-pass filter (LPF) which is indicated in FIG. 4, generally at 50, where the cut-off frequencies are selected to avoid any luminance aliasing at the critical point at 45 degrees. Consequently, the horizontal and vertical Nyquist boundaries 52 end up at only 0.25 cy/pix, which strongly reduce the resolution potential of the sensor, thus reducing sharpness. Since various design aims are used to trade-off aliasing vs. sharpness, the typical CFA camera system frequency response will lie between square 52 and line 22, in two triangular regions 54. One may see the substantial increase in resolution area afforded by a full sensor frame capture system depicted by rectangle 56 intersecting at 0.5 cy/pix in the horizontal and vertical.

Much of the work in the FSC field was done prior to the NTSC color standard, when color field sequential was a competitor for color television. As a consequence, most of the prior art references are old. Analog field sequential color video was difficult to achieve at high frame rates and found its key applications in telecine and other specialized applications. Only recently has the activity picked up due to full digitization of the video system, which makes it easier to couple field sequential color capture to simultaneous color displays.

U.S. Pat. No. 2,738,377, to Weighton, granted Mar. 13, 1956 for *Color Television*, describes a color television system which uses a rotating color filter wheel, with equally spaced wedges in the order GRGBGRGB, with a single pickup tube, and a CRT to constitute a full color television system. The reference describes an eight-fold interlace, with the color wheel spinning fast enough to cause a different color filter for each interlace line. A sufficient number of lines are used to result in a captured image with 400 G lines and 200 R and B lines. The main difficulty with this approach is the extreme demand imposed on the system bandwidth due to the eightfold interlace. Another is that color field sequential display is required in this system, and because of eye movements, such displays are more susceptible to color breakup than color field sequential capture.

U.S. Pat. No. 3,604,839 to Kitsopoulos, granted Sep. 14, 1971 for Field-sequential color television apparatus employing color filter wheel and two camera tubes, describes a television system having a color filter wheel and two camera tubes, which is primarily aimed at telecine. The purpose of the two tubes is to allow for simultaneous capture of two different colors, thus allowing the exposure to lengthen, given the field rate constraints, and increase the signal to noise ratio.

U.S. Pat. No. 3,969,763 to Tan, granted Jul. 13, 1976, for *Color television camera provided with a pickup device and color filter placed in front thereof*, describes a color field sequential camera that uses a single pickup tube and a color filter wheel with many fine color strips. The purpose is to capture the color filtered sections of an image more spatially and temporally coincident. It approaches a color sequential interlace, and is primarily an analog hardware system addressing various delay and converter steps. The reference is notable because it discloses a system which uses liquid filters that are electronically controllable, rather than using a mechanical wheel. The system also captures in a YRB space, rather than the more common RGB.

U.S. Pat. No. 4,067,043, to Perry, granted Jan. 3, 1978 for *Optical conversion method*, describes the use of electro-optically controlling color filtration, in a field sequential mode, via the use of crossed polarizers.

U.S. Pat. No. 4,851,899 to Yoshida et al., granted Jul. 25, 1989, for *Field-sequential color television camera*, describes an RGB field sequential camera using a color wheel that causes the field order to be R1R2G1G2B1B2, etc. Because the first field of each color pair has a residual charge from the previous, different color, the system discards the first captured field in order to prevent color desaturation.

U.S. Pat. No. 4,967,264 to Parulski et al., granted Oct. 30, 1990, for *Color sequential optical offset image sampling system*, combines color field sequential concepts with sensor dithering to increase resolution. A color filter wheel is used containing, in order, 2 green, one red, and one blue element. The two green elements are placed at various tilts to create spatial offsets on the sensor, so the two green fields may be combined to create an image with higher green resolution than would be available solely from the sensor.

U.S. Pat. No. 5,084,761 to Nitta, granted Jan. 28, 1992, for *Video camera with rotatable color filter and registration correction*, addresses the color mis-registration caused by the variations in tilt and thickness of the color filter wheel in color field sequential cameras. The horizontal and vertical deflection signals are adjusted. Even though the color field sequential camera is, by design, not supposed to have a color registration problem, it does in fact have this problem because of the mechanics of the color wheel. The reference seeks to avoid this problem with electronically controlled color filters, such as a LCD.

U.S. Pat. No. 5,548,333 to Shibazaki et al., granted Aug. 20, 1996, for Color mixing prevention and color balance setting device and method for a field-sequential color television camera, addresses color mixing and color balance processes in a RGB filter wheel field sequential color camera. It allows a video field with a mixed color input, that is a transition from one color sector to another of the color wheel, to be used, but discards the signal during the mixed color-time interval.

Another goal of the system is to adjust-timing intervals to achieve white balance, also referred to as color automatic gain control (AGC). The timing intervals are determined from calibration with a white card to compensate for studio lighting color temperature. Due to the nature of the color wheel, the RGB exposure durations retain the same color lag, even if the exposure durations are shortened. This is illustrated up in FIG. 7, where the issues of discarded fields and color mixing have been simplified to highlight the exposure control, which is used for color temperature matching. Top row 56 depicts the exposure durations at a maximum per frame, with the horizontal axis being time, for a total of three frames. Bottom row 58 depicts a reduction in temporal exposure, where white bars indicate periods of no exposure, or non-capturing time, to the sensor accumulator. The start time of each color field is fixed in time due to the fixed patterns on the physical color wheel, so even though the durations are shortened, the color lag, as measured from either center-to-center positions, or from like edge positions, remains the same. A gap 59 is depicted as the non-capturing time between color components. Such a gap will be understood to also be present between each frame.

U.S. Pat. No. 5,748,236, to Shibazaki, granted May 5, 1998, for Color mixing prevention and color balance setting device and method for a field-sequential color television camera, is based on a continuation-in-part application from the '333 patent, supra, however, this reference concentrates on the hardware, and specifically, the concept of discarding the accumulated charge during the mixed interval.

U.S. Pat. No. 5,751,384 to Sharp, granted May 12, 1998, for *Color polarizers for polarizing an additive color spectrum along a first axis and its compliment along a second axis*, describes switchable color filter via polarization and LCD as would be used in digital still and video cameras.

U.S. Pat. No. 5,767,899 to Hieda et al., granted Jun. 16, 1998, for *Image pickup device*, addresses the problem of constant luminance, where the luminance signal is formed prior to any gamma correction. This is opposed to conventional video processing, where the gamma correction non-linearity is applied to the RGB values prior to the formation of the luminance signal. In this device the captured Y, Cr, and Cb outputs from a CFA interpolation process are converted to RGB, gamma corrected, then converted to conventional YR-YB-Y. Various base-clipping, or coring, limiting, and color suppression based on the luminance signal are then incorporated.

SUMMARY OF THE INVENTION

A method of field sequential color image capture includes optically capturing a scene; filtering the scene through an active color filter to produce first color components, thereby modifying the spectral transmission of the scene as a function of time; detecting the scene with a single, monochrome sensor and dividing the scene into multiple second color components, whereby each first color component of the scene is detected at a different point in time; aligning the second color components in time for each frame interval; storing each color component in a memory unit; combining the stored second color components into a frame image; and processing the frame image for color reproduction and format.

A system for capturing a field sequential color image, includes an optical capture mechanism for capturing a scene frame-by-frame in frame intervals; an active color filter for producing multiple first color components; a single monochrome area sensor; an array field selector for dividing the scene into multiple second color components; multiple memory locations for storing each color component; a field-to-frame combiner for combining the stored second color components into a frame image; and a color reproduction processor for processing the frame image for color reproduction and format.

An object of this invention is to provide a color image capture system and method using only a single sensor while capturing the full resolution of the sensor for all three color planes.

Another object is to provide a system and method wherein color lag will decrease as shutter durations decrease.

A further object of the invention is to provide a system and method that reduce color mis-registration.

These and other objects and advantages of the invention will become more fully apparent as the description which follows is read in conjunction with the drawings.

DETAILED DESCRIPTION OF THE PREFERRED EMBODIMENT

The field sequential color approach of this invention attempts to achieve the primary advantages of the 3-CCD approach and the CFA approach, while removing some of their disadvantages. Theoretically, the invention may achieve the full frame resolution of the 3-CCD approach for all color layers of a frame. Because there is only one sensor, the color mis-registration problem due to mechanical alignment is eliminated. The only static color mis-registration in the invention is due to the optics, generally corrected by achromatizing lenses. It also accomplishes full frame resolution without mechanical color mis-registration with one monochrome sensor, exceeding the cost advantages of the CFA approach. Further it does not require the use of interpolation algorithms.

The system of the invention does have its own particular problems, however. The most predominant is the result of capturing the color fields at separate points in time, which results in a misalignment of the colors of a moving edge when the color fields are combined into a single full-color frame. The moving edge may be the result of either object motion or camera motion. This effect is known as "color breakup" or "color lag." This effect may be analyzed as a localized or motion-dependent color mis-registration, causing both luminance blur and color bleeding of moving edges. In some cases, such as still scenes, this color mis-registration is much less than the color mis-registration of the 3-CCD system, but in other cases, such as with fast motion, the color mis-registration may be greater than with the typical 3-CCD approach.

Another problem is in achieving three separate color captures in the duration of a single video frame, which is on the order of 17–33 ms. This was traditionally accomplished by a rotating color filter wheel, which required expensive mechanical engineering. Further, having a component rotating at such high velocities made the cameras more susceptible to mechanical failure, requiring frequent repair and re-calibration. Recently, however, a new method to sequentially modulate color has been developed using electrically-controllable LCDs. These LCDs switch colors through a single optical pathway fast enough to accomplish more than three switches during a video frame, and have the additional advantage that there are no moving parts. The problem of color breakup is reduced by the method of the invention.

Figure 5:
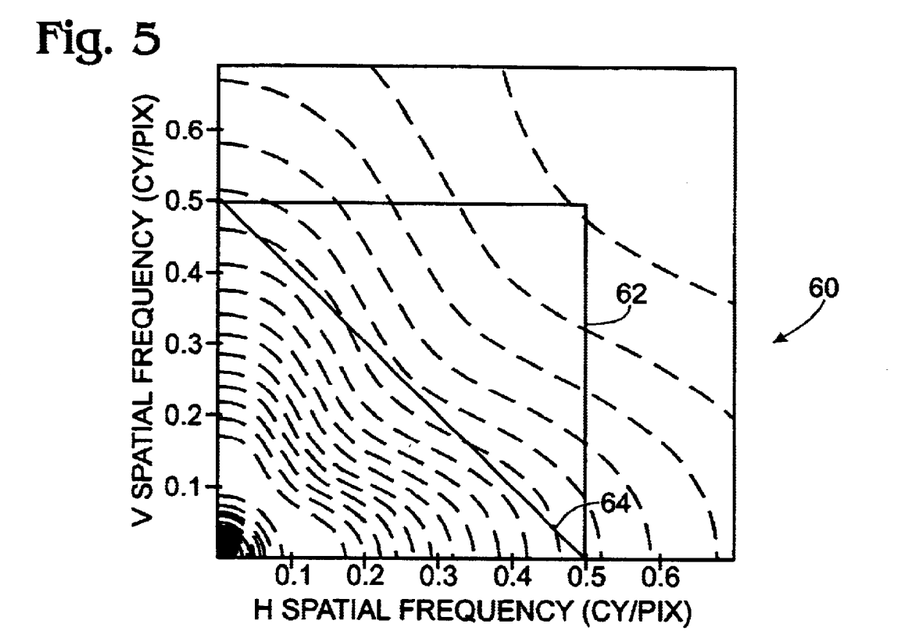
FIG. 5 depicts 4H VD at standard resolution.
Figure 6:
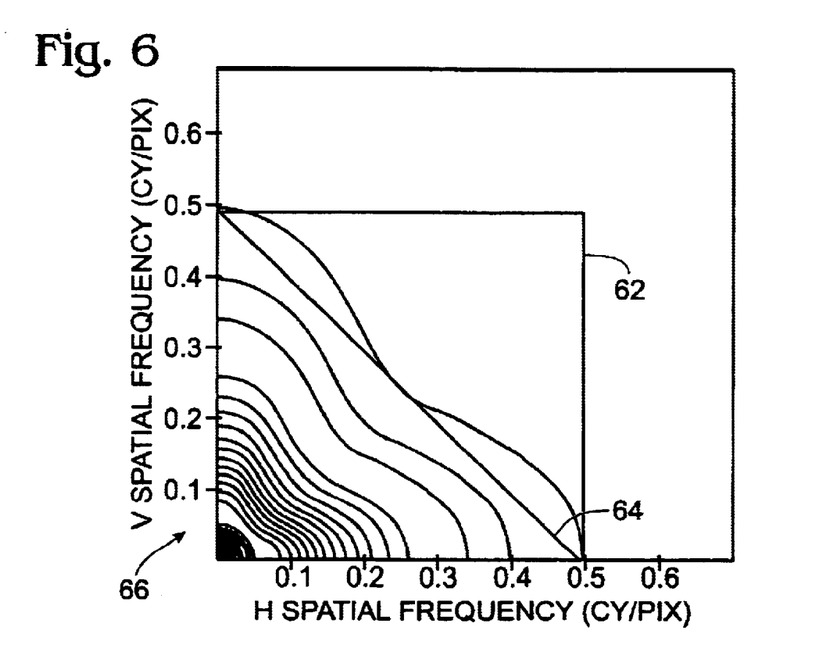
FIG. 6 depicts 4H VD at high resolution.

The various spatial frequency responses of these three systems, i.e., CFA, 3-CCD, and FSC, are shown in FIGS. 5 and 6, plotted against the visual systems 2D contrast sensitivity function (CSF) for more viewing distances and displayed image resolutions. FIG. 5 depicts, generally at 60, the CSF for a standard definition (SD) resolution of 480 lines, but with a more demanding viewing distance of four picture heights (4H). The full frame approaches for 3-CCD and color field sequential, have the same spatial frequency response, bounded by rectangle 62 at 0.5 cy/pix. The CFA has the smaller range, as indicated by the triangle under line 64.

In FIG. 6, the CSF is mapped, generally at 66, to a digital frequency plane for a high definition image and of 960 lines and a viewing distance of 4 picture heights, which is appropriate for high definition viewing. It may be seen that as the viewing distance increases or the number of display lines increases, the CFA begins to match the maximum frequency capabilities of the visual system. Thus the CFA will generally be more optimum for far viewing distances, or high pixel resolution image display, than the full frame approaches. With more demanding viewing distances, i.e., closer, the full-frame approaches will have higher perceived resolution.

The sensor of the invention is monochrome, as opposed to that used in the CFA approach. The sensors used in CFA systems have increased manufacturing costs due to the requirement that an individual filter be placed on each pixel. The reduction from three sensors to one sensor is done so that color breakup is reduced below visibility, and further, so that no perceivable increases in noise occur, despite the shorter capture periods needed per color to maintain the same frame rate as with a 3-CCD or CFA camera system. To this end, images are captured as close as possible in the YUV video space, where Y is luminance, U is a scaled B-Y color difference and V is a scaled R-Y color difference. The key aspect of this capture is to capture Y directly, so that color offsets due to camera motion or object motion do not have any effect on the Y signal. One preferred embodiment of the invention achieves this full-resolution full-color system with only a doubling of the frame rate, as opposed to a tripling. One objective is to adjust the shutter durations, either for motion rendition, or for color balance purposes, so that as the shutter duration decreases, the color lag will decrease as well.

The method relies on key characteristics of the human visual system (HVS) relating the luminance-to-opponent color channels. The ratios of opponent color to luminance are approximately ½ for temporal bandwidth, spatial bandwidth, and maximum sensitivity. These ratios are used in the selection of the relative durations of exposures and in the spatio-temporal integration following image capture. The duration and configuration of the exposures is designed to prevent color lag. The spatio-temporal signal processing following capture is designed to minimize the perception of increased noise, which results from allocating less exposure duration to both the color difference and luminance signals relative to a 3-CCD or CFA image capture. The temporal bandwidth ratio of color-to-luminance indicates that one may temporally low-pass filter or temporally sub-sample the color difference signals relative to the luminance. Temporally averaging of samples after the A/D may be used to reduce the noise caused by shorter exposure durations afforded to the color difference signals. The spatial bandwidth ratio of color-to-luminance allows for spatial low-pass filtering of the captured color difference signals which may also reduce the noise caused by shorter exposures. Both of these effects may translate into shorter exposures for RG and BY than Y. Finally the ratio of sensitivity of color-toluminance means that the color system may have $2^{-\frac{1}{2}}$ the noise of the luminance and yet have the same visibility.

Figure 8:
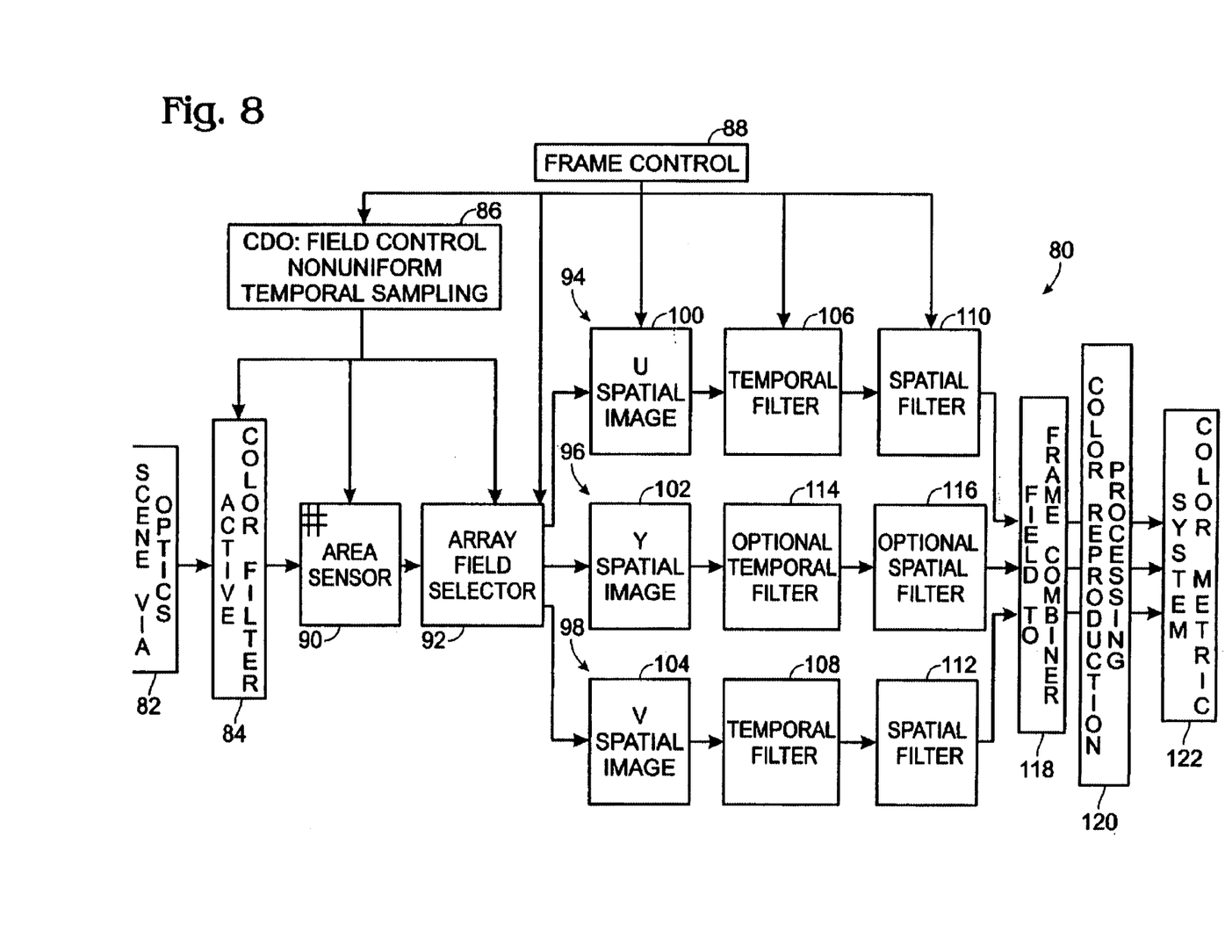
FIG. 8 is a block diagram of the system of the invention.

Referring now to FIG. 8, the invention is depicted generally at 80. A scene 82 is captured via optics and passes through an active color filter 84, resulting in a first color component set, which includes B, Y and R first color components, which changes the spectral transmission of the image as a function of time, and which is controlled by a color field control clock 86, which, in turn is controlled by the frame control clock 88, which operates at a frame rate of 60 frames per second (fps) for current progressive formats, but which may be set to any desired and achievable rate. The filtered scene impinges a monochrome area sensor 90, which nominally detects and captures three color fields. These three images are clocked to an array field selector 92 at the field rate, which is approximately three times faster than the frame rate. However, the color field clock pulses nonuniformly during sampling of the frame interval, as will be described later herein. The three fields captured in different points in time are distributed to the U (94), Y (96) and V (98) channels, also referred to herein as second color components forming a second color component set, and are aligned in time in the same frame interval in the array field selector. The U, Y and V fields are stored in memory as three spatial images per frame, 100, 102 and 104, respectively. The two color difference images, U and V, are then filtered by first low-pass temporal filters 106, 108, and then by low-pass spatial filters 110, 122, respectively, to reduce the noise due to their shorter exposure intervals. The luminance image, Y, may optionally also be filtered by a low-pass temporal filter 114 and/or by a low-pass spatial filter 116. Alternately, bandpass filtering may be used instead of low-pass filtering. The three separate field images are then combined into a frame image by a field-to-frame combiner 118, and processed according to protocols of color reproduction and format by a color reproduction processor 120, for eventual coding for transmission to recorders and other devices as a system color metric 122.

Figure 7:
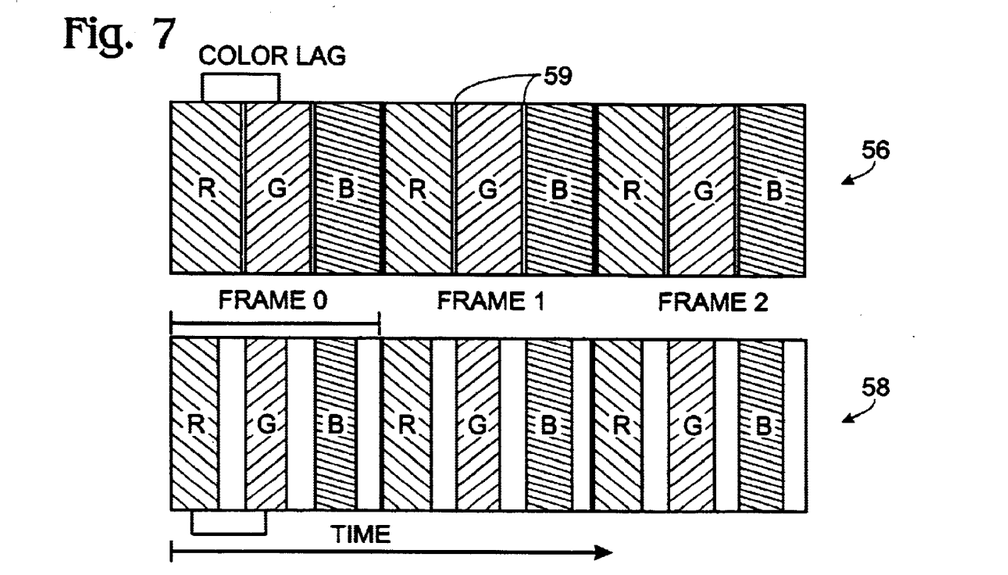
FIG. 7 depicts the effect of reducing shutter durations in prior art field sequential color.
Figure 9:
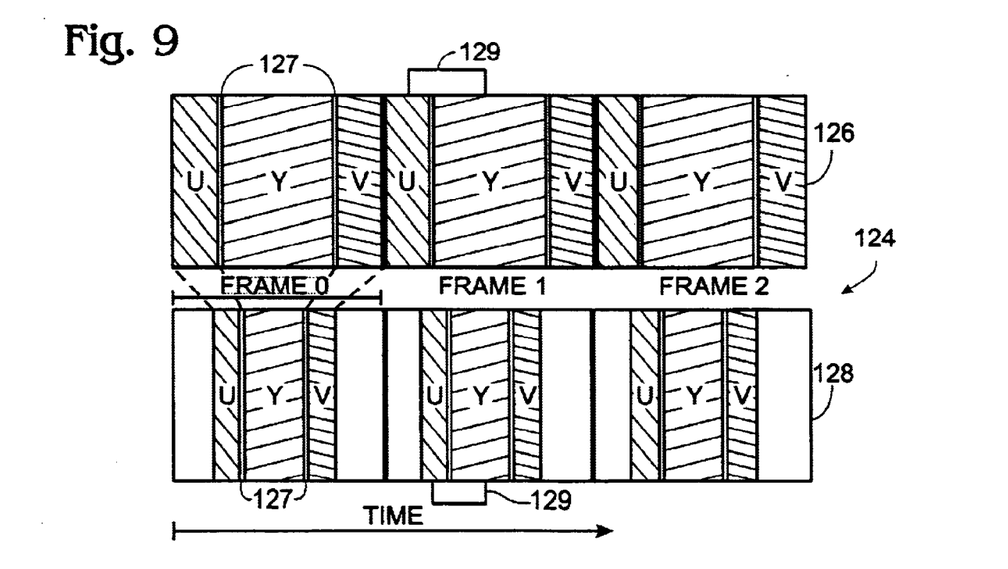
FIG. 9 depicts color field timing.

A basic feature of the invention is shown in FIG. 9, generally at 124. This is the nonuniform temporal sampling of the three color planes per frame, which may be compared to FIG. 7. In FIG. 7, the trigger points for each color component are the same and the color lag is the same regardless of the shutter speed. Non-capturing time 59 is dispersed throughout the frame. The majority of the available frame capture time is used to sample that part of the spectrum, which contributes to luminance component. This value is nominally 75%, but the area sensor clocking rates may force other values to be used. The top row 126 of FIG. 9 depicts the color field capture intervals for the maximum possible duration within a frame. Again, a slight non-capturing time gap 127 exists between the capture of each color component within a frame, and also between frames. The color fields, or components, are indicated U, Y, V, even though it is not possible with current technology to optically capture the U and V signals. However, the terms U and V are used to indicate the color filter fields that will lead predominately to the U, Y and V signals. The trigger points are moved in row 128 as the shutter speed is increased, which results in a decrease in color lag or offset.

In most cases, these filters will be B, Y. and R. The UYV order is preferred and was arrived at through experimentation. This order minimizes the color offset of the color differences from luminance, as there is some minimal luminance leaking into the U and V signals. The bottom row 128 of FIG. 9 depicts the system behavior as the "shutter speed" is increased, i.e., the total exposure duration is shortened in order to enable better motion rendition, reduce the aperture time if the light level is very high, or for color balance functions, in which case the UYV intervals will be changed relative to each other. Color lag 129 may best be characterized by the center time between the different YUV fields of a single frame. The color lag for row 128 is markedly less than that for row 126 with its slower shutter speed. In row 128, capturing takes place in the temporal center of each frame. Capturing the color components includes capturing each color component of the first color component set in a time interval that is less than the inverse of the number of color components in the first color component set. This is an advantage of the invention because the color offset is reduced as the shutter speed is increased. The behavior of the prior art in FIG. 7 suffers from the same color offset regardless of shutter durations, as seen from the color log markers. It will be appreciated that "capturing" actually takes place over the entire duration of the frame during the open exposure time of each frame, however, the center-of-mass of the exposure is in the temporal center of each frame.

In the most common applications, the invention requires a color field rate of three times the frame rate, which in turn requires a 90 fps data rate for the transfer from imager to memory for a system using a frame rate of 30 fps. This is applicable to interlace at 60 interlace fields/sec, or a progressive system at 30 fps. For a progressive system at 60 fps, the data unloading from the imager works at a rate of 180 fps.

Figure 10:
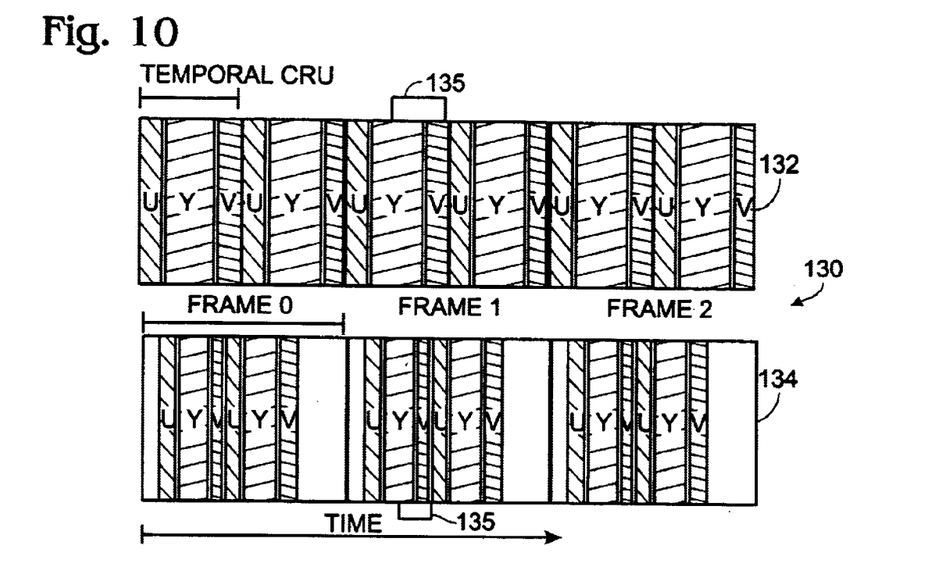
FIG. 10 depicts finely dithered color field timing.

In a modified form of the invention, the UYV samples are more finely sub-divided within a frame, as shown in FIG. 10, generally at 130. Top row 132 depicts the color field capture intervals for the maximum possible duration within a frame. Bottom row 134 depicts the behavior for increased shutter speed. More finely dithering the UYV samples within a frame reduces the color breakup artifact, but forces the data rate off the sensor to be faster. The rate of the active color filter also needs to be similarly increased, but currently the limiting technology is in getting the data off the imager. In FIG. 10, two color reproduction units (CRUs) are depicted, which form the UYV temporal triad, for each frame. More CRUs may be used, at the cost of more expensive hardware. This technique reduces the color breakup, transforming it more into a familiar luminance blur that is no greater than that observed for the equivalent shutter speed for CFA or 3-CCD cameras. As in FIG. 9, bottom row 134 depicts the behavior for faster shutter speeds, where once again the color offset 135 reduces with decreasing shutter durations.

Figure 11:
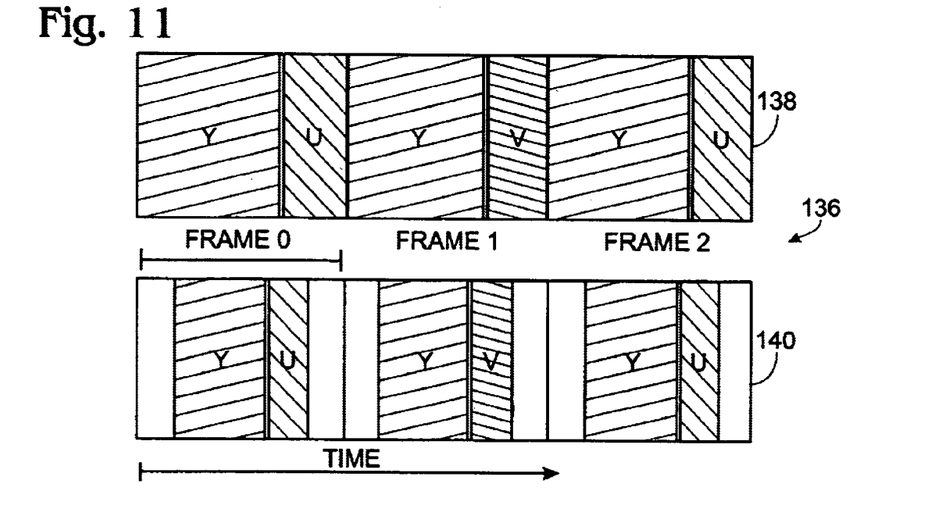
FIG. 11 depicts temporal subsampling implementation of color field timing.

The results of using an embodiment of the invention that imposes the lowest burden on the imager data transfer is depicted in FIG. 11, generally at 136. Top row 138 depicts the color field capture intervals for the maximum possible duration within a frame. Bottom row 140 depicts the behavior for increased shutter speed. This embodiment of the invention only requires a data rate twice that of the frame rate. In each frame a Y sample is taken, but the U and V components are sampled only in alternate frames. This results in an effective temporal subsampling of the color difference signals by a factor of 2, which is known to be visually equivalent to full temporal sampling, due to the visual properties previously identified herein. In fact, even though the two color difference samples are 180 degrees out of phase, this result is indistinguishable from the case where the color difference images are sub-sampled by 2, but kept in phase. This system may be achieved using a modest 60 fps chip, resulting in 30 fps Y and 15 fps R-Y and B-Y progressive signals. As in FIGS. 9 and 10, bottom row 140 depicts the advantageous behavior of the invention for faster shutter speeds.

Figure 12:
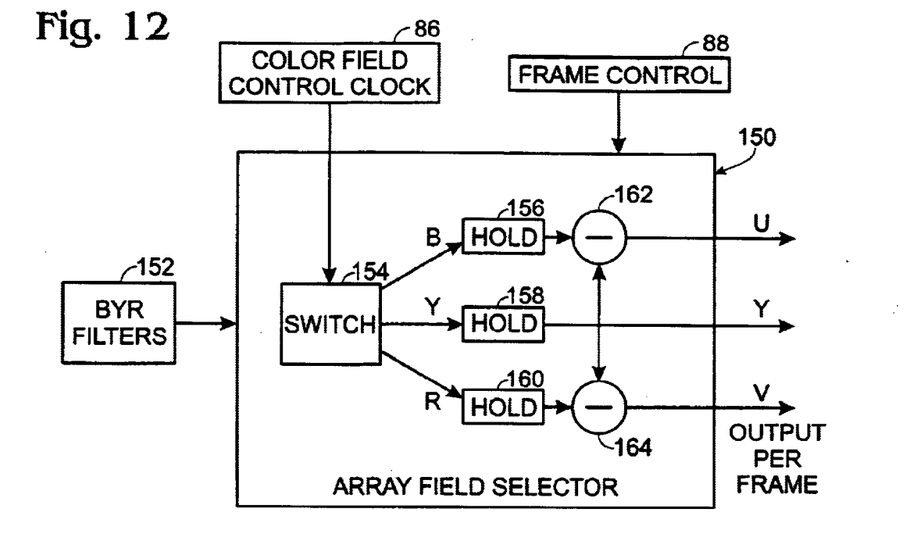
FIG. 12 depicts a specific implementation of an array field selector.

The next two embodiments of the invention impact the design of the array field selector of the invention. FIG. 12 depicts the first of these embodiments of an array field selector 150 wherein the active color filters 152 are B, Y and R. Frame control 88 is used to gate the three color fields to a single frame interval, while color field control clock 86 directs the B, Y and R images through a switch 154 to separate arrays 156, 158, 160, respectively, in memory. A B-Y differentiator 162 and a R-Y differentiator 164 result in the formation of the U and V color difference signals from these captured wavelength spectra. The specific scaling and offsets to make the U and V signals compatible is applied in the color reproduction processing mechanism/step of FIG. 8.

Figure 13:
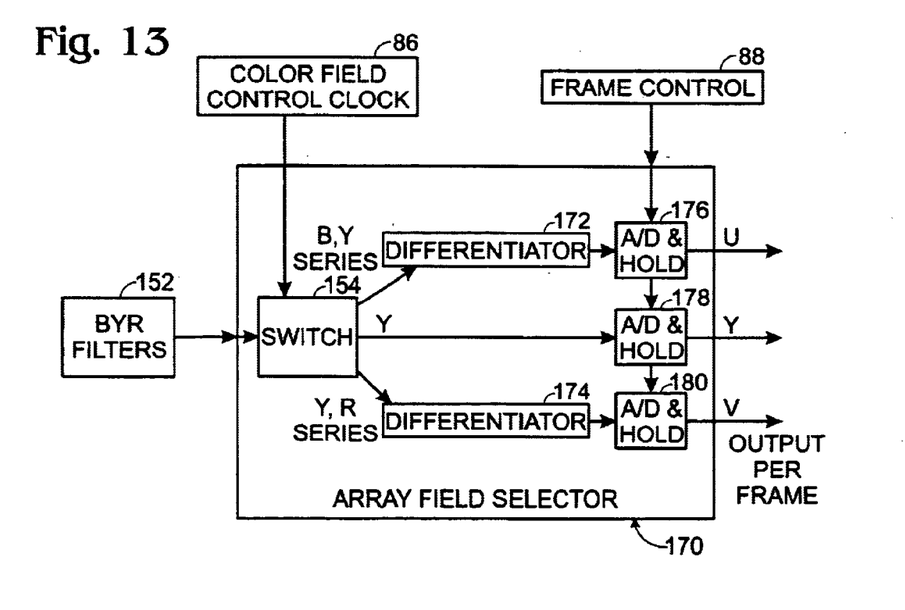
FIG. 13 depicts an alternate implementation of an array field selector.

The next embodiment is depicted in FIG. 13, where the U and V signals are generated in the analog domain for an array field selector 170 with temporal differentiators 172, 174 applied across the U and Y transition, and the Y and V transition, respectively. The A/D conversions 176, 178, 180, occur after the analog differentiation, and the images are held throughout the duration of the frame. This embodiment has the advantage of reducing bit-depth noise, and consequently, bit-depth requirements, for the color difference signals. Depending on the temporal characteristic of the differentiators, this may also concentrate the signal energy going into the U and V channels to be more temporally contiguous to the Y channel.

Although the Y filter characteristics may be white or green, other embodiments using any luminance function, such as VA, may be used, so long as the filter characteristic is as close to the V-function, which appears as yellow-orange color, as possible.

Although a preferred embodiment, and several variations thereof have been described, it will be appreciated by those of skill in the art that further variations and modifications may be made thereto without departing from the scope of the invention as defined in the appended claims.

I claim:

1. A method of field sequential color image capture comprising:
   optically capturing a scene frame-by-frame;
   filtering the scene through an active color filter to product a first color component set having plural first color components therein, thereby modifying the spectral transmission of the scene as a function of time, including operating a color field clock at a first predetermined rate and operating a frame control clock at a second predetermined rate, wherein the first predetermined rate is greater than the second predetermined rate, and wherein the first predetermined rate is set to about 2X that of the second predetermined rate;
   detecting the scene with a single, monochrome sensor, wherein each first color component of the first color component set of the scene is detected at a different point in time within a frame;
   dividing the detected scene into a second color component set having plural second color components therein, including temporally dividing the scene into U, Y and V color components;
   aligning the second color component set in time for each frame interval;
   storing each second color component in a memory unit;
   combining the stored second color components into a frame image; and
   processing the frame image for color reproduction and format.

2. The method of claim 1 which includes, after said storing, filtering at least some of the second color components to reduce noise.

3. The method of claim 2 wherein said filtering includes temporally and spatially filtering the U and V color components.

4. The method of claim 2 wherein said filtering includes temporally and spatially filtering the Y color component.

5. The method of claim 1 wherein said operating includes setting the first predetermined rate to about 3X that of the second predetermined rate.

6. The method of claim 1 wherein said filtering includes filtering the scene to capture B, Y and R first color components.

7. The method of claim 6 wherein said dividing includes storing B, Y and R first color components and differentiating B-Y to form a U second color component and differentiating R-Y to form a V color component.

8. The method of claim 7 wherein said differentiating is temporal differentiating.

9. The method of claim 1 wherein said capturing includes directly capturing a luminance color component.

10. The method of claim 1 wherein said capturing includes capturing each first color component of the first color component set in a time interval that is less than the inverse of the number of first color components in the first color component set applied to a per-frame capture cycle time for the first color component set.

11. A system for capturing a field sequential color image, comprising:
   an optical capture mechanism for capturing a scene frame-by-frame in frame intervals which operates at a predetermined exposure duration;
   an active color filter for producing a first color component set having plural first color components therein, thereby modifying the spectral transmission of the scene as a function of time;
   a single monochrome area sensor for sensing said first color components, wherein each first color component of the scene is detected at a different point in time within a frame;
   an array field selector for dividing the scene into a second color component set having plural second color components therein;
   a color field control clock for controlling said active color filter, said area sensor and said array field selector at a first predetermined rate and for aligning the second color components in time for each frame interval;
   multiple memory locations for storing each color component;
   a field-to-frame combiner for combining the stored second color components into a frame image;
   a color reproduction processor for processing the frame image for color reproduction and format; and
   a frame clock for controlling said color field clock, said memory locations, and said field-to-frame combiner at a second predetermined rate, wherein said first predetermined rate is greater than said second predetermined rate.

12. The system of claim 11 wherein said array field selector divides the scene into U, Y and V color components.

13. The system of claim 12 which includes temporal and spatial filters for temporally and spatially filtering at least some of the second color components.

14. The system of claim 13 which includes temporal and spatial filters for temporally and spatially filtering the U and V color components.

15. The system of claim 13 which includes temporal and spatial filters for temporally and spatially filtering the Y color component.

16. The system of claim 11 wherein said first predetermined rate is 3X that of the said second predetermined rate.

17. The system of claim 11 wherein said first predetermined rate is 2X that of the said second predetermined rate.

18. The system of claim 11 wherein said color field clock operates at a time interval less than the inverse of the number of said first color components in said first color component set, applied to a per-frame capture cycle time for the first color component set, to reduce color lag as said predetermined shutter speed increases.

19. The method of claim 11 wherein said first color components are B, Y and R.

20. The method of claim 19 wherein said array field selector stores B, Y and R first color components and differentiates B–Y to form a U second color component and differentiates R–Y to form a V color component.

21. The method of claim 19 wherein said array field selector stores B, Y and R first color components and temporally differentiates B–Y to form a U second color component and temporally differentiates R–Y to form a V color component.

* * * * *